No. 876,264. PATENTED JAN. 7, 1908.
I. E. BURLEY.
MEASURING INSTRUMENT.
APPLICATION FILED JULY 25, 1906.
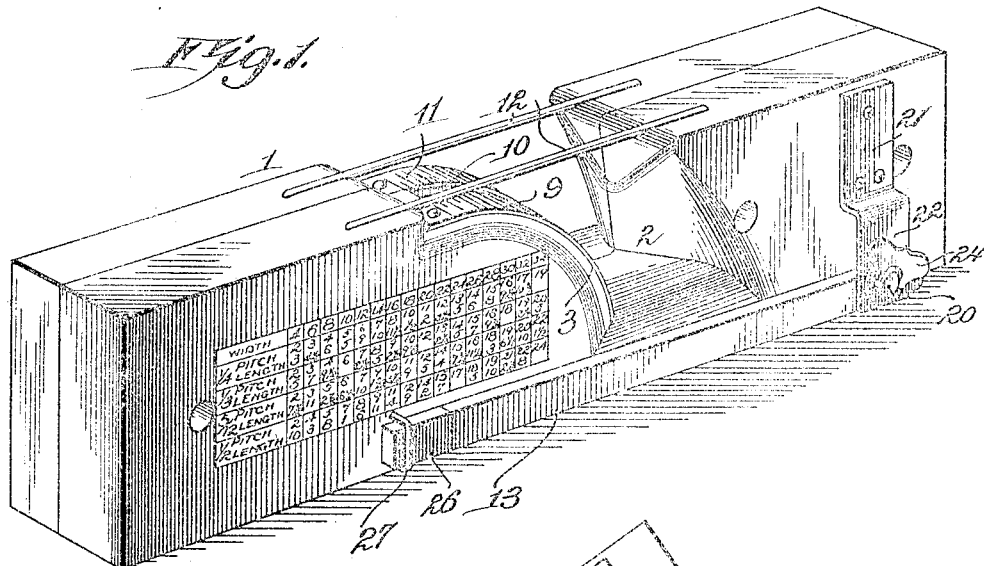
Fig. 1.
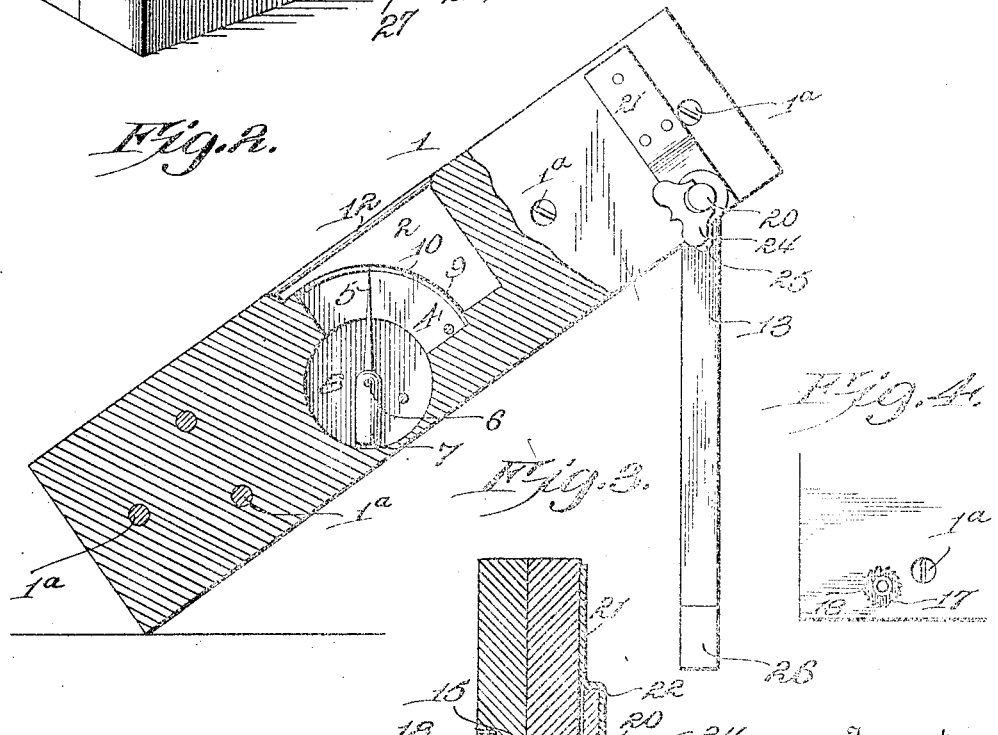
Fig. 2.
Fig. 3.
Fig. 4.
Witnesses
Inventor
Attorney

UNITED STATES PATENT OFFICE.

IRA E. BURLEY, OF HIGHWOOD, MONTANA, ASSIGNOR OF ONE-HALF TO JOHN HENRY, OF HIGHWOOD, MONTANA.

MEASURING INSTRUMENT.

No. 876,264.   Specification of Letters Patent.   Patented Jan. 7, 1908.

Application filed July 25, 1906. Serial No. 327,687.

*To all whom it may concern:*

Be it known that I, IRA E. BURLEY, a citizen of the United States, residing at Highwood, in the county of Chouteau and State of Montana, have invented a new and useful Measuring Instrument, of which the following is a specification.

The invention relates to improvements in measuring instruments.

The object of the present invention is to improve the construction of measuring instruments, and to provide a combined level and plumb adapted to be employed as an inclinometer for determining whether objects are level, plumb or inclined, and for ascertaining the angle or degree of inclination, if inclined.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a perspective view of a combined level and plumb, constructed in accordance with this invention, and shown folded. Fig. 2 is a side elevation partly in section, the stock or body of the level being in an inclined position, and the plumb being vertical. Fig. 3 is a transverse sectional view, illustrating the manner of moving the plumb. Fig. 4 is a detail view, illustrating the construction of the ratchet head of one of the sections of the pivot.

Like numerals of reference designate corresponding parts in all the figures of the drawing.

1 designates a level stock or body, composed of two sections and designed to be constructed of wood, or other suitable material. The sections are detachably secured together by screws 1ª, or other suitable fastening devices, which have their heads arranged in recesses or sockets of the contiguous section of the level stock or body. The level stock or body is provided at an intermediate point with a recess 2, and the wall 3 at one side of the recess is convexly curved to present an arcuate surface. This wall of the recess 2 is provided with a slot 4 to receive the needle portion of a pointer or indicator 5, which is mounted within the stock or body on a transverse pivot 6, and which is provided with a suitable weight 7 for maintaining the pointer or indicator in a perpendicular position. The level stock or body is provided with an interior chamber 8 for the indicator or pointer, and a curved plate 9 is secured to the curved wall 3 of the recess, as clearly shown in Figs. 1 and 2 of the drawing. The curved plate 9 is provided with a slot 10, to correspond with the slot 4 of the stock or body, and it has graduations 11 at opposite sides of the slot 10. The pointer or indicator is adapted to swing between the graduations, and its position may be accurately ascertained at either side of the level or body. The degree of elevation of the level stock or body, when the latter is arranged at an inclination, is indicated by the pointer.

Guards 12 are preferably employed for preventing any object from falling into the recess 2 and injuring the indicating means. The guards 12 consist of parallel rods or pieces spanning the recess, and extending longitudinally of the stock or body, and suitably secured at their terminals to the same.

A plumb 13 is secured to the level stock or body at one side thereof by means of a transverse pivot 14, located adjacent to one end of the said stock or body, and composed of adjustable connecting sections 15 and 16. The section 15 is provided with a ratchet head 17, having peripheral ratchet teeth for engaging an annular series of ratchet notches 18 of the level stock or body. The section 15 is provided at its inner portion with male threads for engaging female threads of the section 16, which is tubular and which is provided at its outer end with a head 20. The section 16 of the pivot is supported adjacent to its outer end by a brace 21, secured to the level stock or body and having an angularly bent approximately L-shaped portion 22, which is provided with a perforation for the reception of the pivot 14. The washer 23, which is mounted on the pivot 14, is interposed between the plumb and the level stock or body, and the tubular section 16, which is adjustable, is provided at its outer end with a pivoted winged grip, or handle portion 24, which is adapted to be folded against the brace. The plumb 13, which consists of a bar, is provided at its pivoted end with a slot 25, and it has a weight 26 at the other end. The bar of the plumb may be conveniently constructed of wood, and the weight 26 preferably consists of a block or piece of lead, suitably secured to the lower end of the plumb. When the measuring instrument is not in use, the plumb may be folded alongside the stock or body, and the weighted end of the plumb is received within a keeper 27, consisting of a substantially rectangular loop, projecting from one side of the stock or body, and the slot 25 enables the weighted end of the plumb to be readily introduced into and removed from the keeper.

In the use of the device, the plumb will swing to a perpendicular position, and it may be clamped in such position by the adjustable pivot. The device is adapted to be employed as an inclinometer, and is designed to be provided with a scale for indicating the length of the rafters at a certain pitch, and the stock or body may be equipped with other similar scales to adapt the measuring instrument for any particular kind of work.

In various operations of carpentry where it is desirable to plumb an upright, and ascertain an angle with relation to such upright, the instrument will be found more advantageous than a separate plumb and a separate inclinometer, owing to the combination of these two instruments in one, and also because the plumb bar and the level stock or body may be clamped together to preserve their relative adjustment.

Having thus fully described my invention, what I claim as new and desire to secure by Letters Patent, is:—

1. An instrument of the class described comprising a stock or body having a level, a plumb bar pivotally connected with the stock or body at one side thereof, a substantially U-shaped keeper extending laterally from the stock or body and arranged to receive the free end of the plumb bar, and means located at the said pivot for permitting the plumb bar to have a limited longitudinal movement to introduce it into and remove it from the keeper and for clamping the said plumb bar in engagement with the keeper.

2. An instrument of the class described comprising a stock or body having a level, a plumb consisting of a bar provided with a slot, a pivot passing through the slot and securing the plumb to the stock or body, a keeper consisting of a loop and arranged to receive the plumb, and means mounted on the pivot for clamping the plumb bar in engagement with the keeper.

3. An instrument of the class described comprising a stock or body having a plurality of ratchet notches, a plumb bar, and an adjustable pivot for the plumb bar forming a clamp for the same and having a ratchet head engaging the notches of the stock or body, the latter carrying a level.

4. An instrument of the class described comprising a stock or body having a plurality of ratchet notches, a plumb bar, and a pivot connecting the plumb bar to the stock or body and composed of two adjustable connecting sections, one of the sections being provided with a ratchet head for engaging the ratchet of the stock or body, said body carrying a level at an intermediate point of its length.

5. An instrument of the class described comprising a stock or body having a level, a plumb bar pivotally connected with the stock or body at one end thereof, a keeper extending laterally from the stock or body and arranged to receive the free end of the plumb bar, and means located at the said pivot for permitting the plumb to have a limited longitudinal movement to introduce it into and remove it from the keeper and for clamping the plumb bar in engagement with the keeper.

In testimony, that I claim the foregoing as my own, I have hereto affixed my signature in the presence of two witnesses.

IRA E. BURLEY.

Witnesses.
  C. W. HAY,
  H. L. DesCombes.